United States Patent [19]

King

[11] Patent Number: 5,083,972
[45] Date of Patent: Jan. 28, 1992

[54] METHOD AND APPARATUS FOR DECAPITATING AND EVISCERATING FISH

[76] Inventor: Bobby G. King, 125 Kelly Ave., Marianna, Fla. 32446

[21] Appl. No.: 513,119

[22] Filed: Apr. 23, 1990

[51] Int. Cl.⁵ ............................................. A22C 25/14
[52] U.S. Cl. .................................... 452/108; 452/106; 452/121
[58] Field of Search ........................ 452/46, 52, 58, 59, 452/60, 63, 108, 107, 106, 121, 122

[56] References Cited

U.S. PATENT DOCUMENTS

| | | | |
|---|---|---|---|
| 1,615,304 | 1/1927 | Korner et al. | 99/589 |
| 2,558,608 | 6/1951 | Danielsson | 17/58 |
| 3,364,517 | 1/1968 | Bartels | 17/52 |
| 3,510,910 | 5/1970 | Erkins | 17/52 |
| 3,843,998 | 10/1974 | Wenzel | 17/60 |
| 4,215,452 | 8/1980 | Nagrotzki | 17/60 |
| 4,291,436 | 9/1981 | Wulff | 17/59 |
| 4,307,491 | 12/1981 | Dafgard | 17/60 |
| 4,531,261 | 7/1985 | Sanaka | 17/71 |
| 4,606,387 | 8/1986 | Weislogel et al. | 144/356 |
| 4,729,305 | 3/1988 | Spencer | 17/10 |

Primary Examiner—D. S. Meislin
Assistant Examiner—Lawrence Cruz
Attorney, Agent, or Firm—Arthur G. Yeager

[57] ABSTRACT

Apparatus including a continuously traveling endless conveyor having receptacles for receiving fish in an aligned position, passing them under a rotating cutter to cut through the head and backbone of the fish and then through an impact device to engage the partially decapitated head and forcibly sever it from the body while simultaneously at least partially eviscerating the fish.

26 Claims, 3 Drawing Sheets

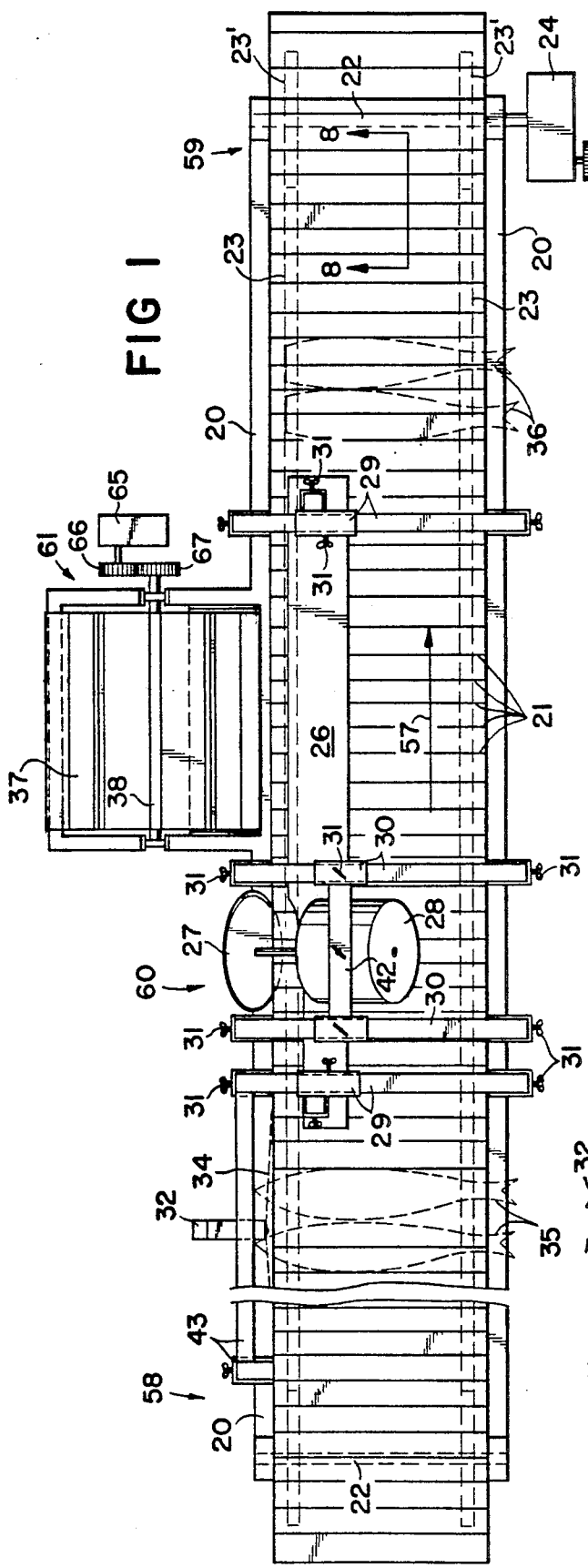
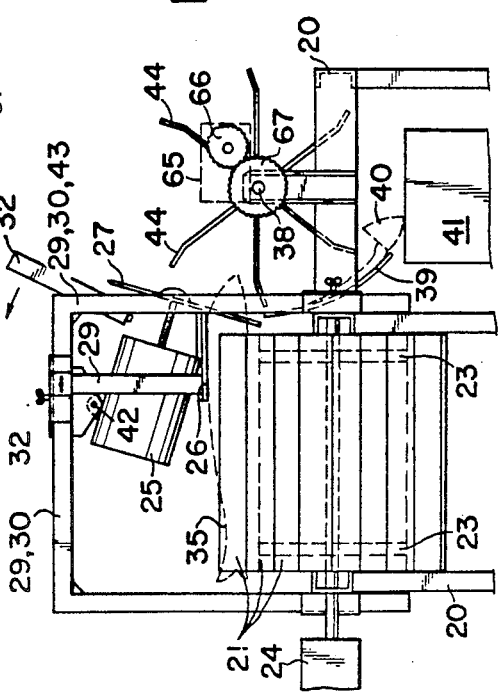
FIG 1
FIG 3
FIG 4

METHOD AND APPARATUS FOR DECAPITATING AND EVISCERATING FISH

CROSS-REFERENCE

This application is based on a previously filed Document Disclosure No. 240683, filed Dec. 4, 1989.

BACKGROUND OF THE INVENTION

Today, the fishing industry is experiencing a loss of older people skilled in the processing of fish for freezing or for sale as fresh fish. Younger workers lack the skill and interest in this area. While some machines have been invented to decapitate and eviscerate fish, they have been too complicated and a great need exists for a simple machine with fewer moving parts and requiring less skill to operate. The machine must, of course, be commensurate with the results achieved by the manual process of the old skilled worker. The machine must produce processed fish at a fast rate and provide safety against injury that frequently occurred in the manual process.

Machines that have been developed in the prior art are too expensive for the smaller processor and too slow (average of 60 fish per minute). They have too many parts and generally use nose guides to position the fish as they enter the machine. The use of nose guides limits the processor to a narrow range of fish and generally requires that he grade the fish into size groups before processing.

It is the object of the present invention to provide a machine which can be successfully operated by the unskilled person in positioning each fish for machine processing. Another object of this invention is to provide a rotating blade cutter for severing the backbone at a 0–30 degree angle to recover more of the edible portion of the fish. Still another object is to provide a guide rail to follow in the path of rotating blade and temporarily hold the body portion of fish, while a rotating impact device forces the head and neck down onto a slide and away from the body of the fish and simultaneously pulls the entrails out of the fish for removal. This machine results in a higher yield, a broader range of fish, and a faster production (150-160 fish per minute). Still other objects will become apparent from the more detailed description which follows.

BRIEF SUMMARY OF THE INVENTION

This invention relates to an apparatus for decapitating and eviscerating fish comprising a frame, an endless chain conveyor supported on the frame, power means moving the conveyor in an endless cyclical path, and a plurality of receptacles on the conveyor to receive and carry one fish per receptacle through zones for beheading and eviscerating. A power cutting means is positioned to partially cut through the head and backbone of each fish as it passes by the cutting means and impact means engages each fish head after it has been cut by the cutting means to forcibly detach the fish head and simultaneously to pull the entrails from the body of the fish.

In specific and preferred embodiments of the invention the conveyor is formed of two parallel chains and a plurality of V-shaped receptacles to conduct a single fish in each receptacle through the decapitating and eviscerating zones; the invention includes a light means to produce a visible line of light for aligning the fish as each is loaded onto the conveyor; and a guide bar which serves to maintain the fish in its receptacle when being cut by the cutting means and to restrict the movement of the fish while being decapitated and eviscerated by the impact means.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a top plan view of the apparatus of this invention;

FIG. 3 is an end elevational view of the apparatus of this invention;

FIG. 4 is an enlarged perspective view of a first embodiment of the guide as used on the fish;

DETAILED DESCRIPTION OF THE INVENTION

The invention is best understood by reference to the attached drawings.

Figure 2:
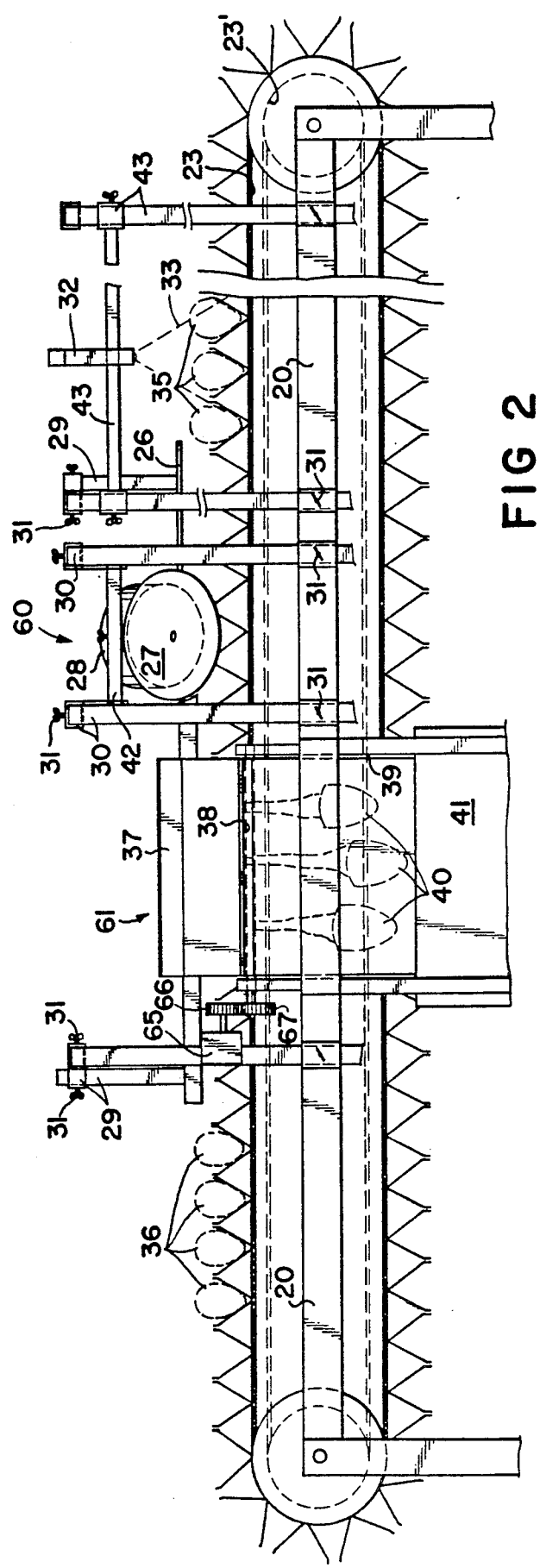
FIG. 2 is a front elevational view of the apparatus of this invention.

In FIGS. 1-3 the conveyor apparatus of this invention is shown to include a framework 20 made of metal structural beams (channels, angles, I-beams, H-beams or the like) is built by welding, bolting, or the like. On the frame 20 is an endless chain conveyor comprising two parallel spaced chains 23 and a plurality of fish receiving receptacles 21. The conveyor is powered by a motor 25 and a speed reducer 24 driving a pair of spaced sprockets 23' meshed with respective chains 23 for transmitting rotational forces from reducer 24 to linear movement forces to operate chains 23. It is to be understood that chains 23 and sprockets 23' may be substituted by other well known driving means for transforming rotational forces of the reducer 24 to linear movement of the conveyor. For purposes of illustration the conveyor is shown as moving from left to right in FIG. 1 in the direction of arrow 57 from loading end portion 58 to unloading end portion 59.

At the loading end 58 fish 35 are placed by hand into the receptacles 21 with all fish being oriented with their noses pointing in the same direction (upward in FIG. 1), their tails pointing in the opposite direction (downward in FIG. 1), with their backs pointing upward, and their bellies downward into receptacles 21. An overhead lighting means 32, such as a laser, is positioned above the noses of fish 35 emitting a curtain of light 33 downward and focused to produce a visible line of light 34 parallel to the conveyor direction of travel 57. The line of light 34 may be adjustably positioned so as to be usable for different sizes or types of fish. This provides an index for positioning the fish 35 as they are loaded onto conveyor end 58 so that the decapitation will occur at the location selected to recover the maximum amount of fish meat. For example, the line of light 34 might be positioned such that it falls across the eyes of the fish and thus provides an easy alignment aid for those loading fish 35 onto the conveyor. Light means 32 is mounted on vertical and horizontal support beams 43 which are slidably adjustable with respect to each other and to frame 20 of the conveyor. Wing nuts 31 are shown as means for tightening the support beams in any selected position. It is to be understood that the light means 32 could be suspended from the ceiling rafter, if desired.

The fish 35 after being loaded onto the moving conveyor pass under the upstream end of a stop means in the form of a guide 26, which at this location is a horizontal plate 45 which maintains the fish in the receptacles 21. The fish then passes through the partial decapitation zone 60 where a cutting means in the form of a revolving cutter disc 27, driven by cutter motor 28, cuts through the back and the backbone of the fish. The depth of the cut (49 in FIG. 4 and 51 in FIG. 5) preferably is about 50–70% of that necessary to fully decapitate the fish. Cutter disc 27 may be a knife blade, a saw blade, or any other type of blade capable of quickly and cleanly cutting through the fish head, scales, bone, skin, and meat of the fish. Cutter 27 is adjustably mounted on support beams 30 which, in turn, are adjustably supported on frame 20 such that beams 30 may slide vertically or horizontally. Motor 28 is supported on a shaft 42 which permits adjustment of the angle of cutter disc 27 from the vertical, generally from about 0° (vertical) to about 30° inward away from the fish nose at the bottom of the cut. This, as has been mentioned above, permits a recovery of a substantial portion of the meat of the fish along the back between the head and the dorsal fin.

As soon as the fish passes beyond cutter disc 27, a downwardly directed leg 46 (see FIGS. 4–6) of guide 26 slides into the cut (49 in FIG. 4 and 51 in FIG. 5) in the head of the fish, and the fish, thus guided and maintained in its receptacle by guide 26, passes to the eviscerating zone 61 of the apparatus.

In the eviscerating zone 61 the partially decapitated fish is subjected to an impact device which severs the head from the body of the fish and simultaneously pulls the entrails out of the fish. In the embodiment shown here the impact means or device 37 is similar to a paddle-wheel in that radiating outwardly from a central rotating shaft 38 are a plurality of arms 44 (six shown in FIG. 3) which grab and force the head of the partially decapitated fish down onto slide 39 with enough force to sever the head from the body and draw out the entrails attached to the head. The head and entrails 40 fall down the arcuate slide or plate 39 into receiver 41 for disposal. A variable power means 65 drives shaft 38 and the connected arms 44 via suitable gears 66 and 67 or chain drives.

The beheaded and eviscerated fish 36 then move along on the conveyor beyond the end of guide 26 toward unloading end 59 of the conveyor where the cleaned fish are removed, by hand or otherwise, and packaged for sale or for freezing.

Figure 5:
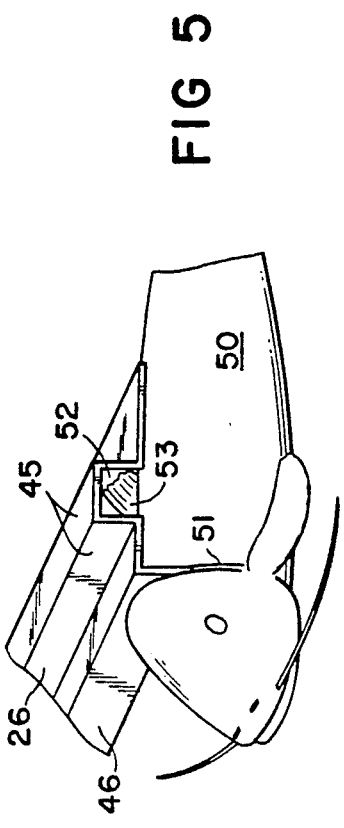
FIG. 5 is an enlarged perspective view of a second embodiment of the guide as used on certain fish types.

In FIGS. 4–5 there are shown two embodiments of the stop means or guide 26 for use with different types of fish and for different angles of cut in decapitating the fish. In FIG. 4, the normal fish such as a skipjack or ladyfish, guide 26 is a simple angle beam having a horizontal leg 45 and a vertical leg 46 connected at an angle 56 of 60°–90°, which translates to an angle of 30° to 0° away from the vertical. A cutout portion 47 upstream from the fish 48 allows disc cutter 27 to be substantially aligned with vertical leg 46. As the fish passes by cutter 27, vertical leg 46 slides into the cut (49 in FIG. 4 and 51 in FIG. 5) in the fish made by cutter 27. This serves as a guide and a retainer of the fish within the receptacle during the eviscerating action by the impact device 37. The embodiment in FIG. 5 differs in that guide 26 is shaped to accommodate the upper fin 53 found on some fish, such as the catfish and the cut 51 is just behind the pectoral fins.

Figure 6:
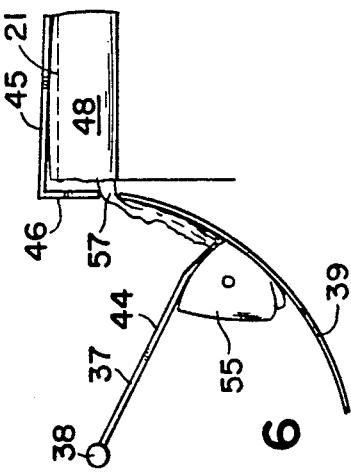
FIG. 6 is an enlarged end elevational view illustrating the impact device and slide of this invention.

In FIG. 6, the action of paddle device 37 engaging the head 55 and pulling it down on the slide 39 is clearly shown. The blade 44 terminates short of arcuate slide 39 about one-half inch, i.e. slide 39 has a radius of about one-half inch longer than the radial distance from the center of shaft 38 to the free end of arm 44. As the fish are moving along the horizontal a slight twisting action occurs as the fish are being impacted by arm 44 drawing the head 55 down the slide 39. The guide 26 with its horizontal leg 45 more closely spaced to the top of the receptacles 21, i.e., guide 26 adjacent the downstream end of the eviscerating zone 61 is adjusted at a lower level than at the upstream end before the partial decapitating zone 60, causes the fish to be caged by the guide and receptacles so that they may lay against a side of a V-shaped receptacle 21 without being permitted to rotate therein thus ensuring complete decapitation by the impact device 37. For catfish it probably is also necessary, due to their very tough skin to partially cut from the bottom about one-fourth to one-half inch to make the complete decapitation easier to accomplish.

Figure 7:
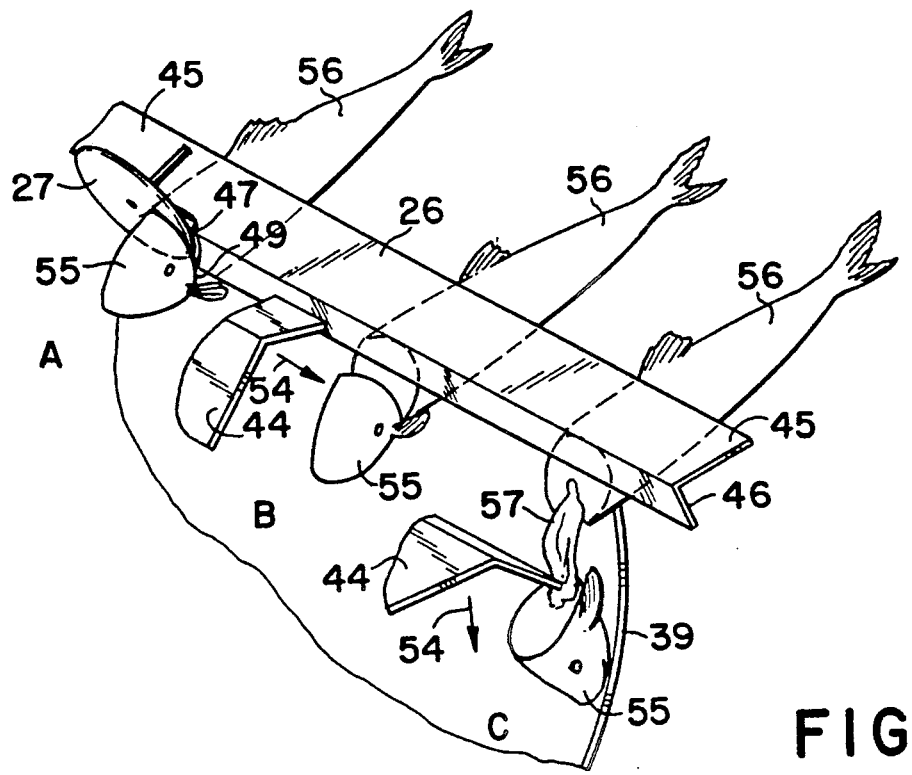
FIG. 7 is a schematic perspective view of the principal operations of the apparatus of this invention.

In FIG. 7 the operations of decapitating and eviscerating are shown schematically. At A of FIG. 7 the fish 56 passes under the upstream end of clamping guide 26 which consists of horizontal leg 45 that is over the back of the fish 56 but does not normally engage the fish until after it passes cutter 27. There is no vertical leg 46 at this portion of guide 26 because it is preferred to cut the fish in substantial alignment with vertical leg 46 on the downstream end of guide 26. In the partial decapitating zone 60, when the fish 56 passes cutter 27 forming a cut or slot 49 (in FIGS. 4 and 7 and 51 in FIG. 5) partially through the head, the vertical leg 46 will be received in such slot as soon as the fish passes the cut out end portion 47 of guide 26. Generally vertical leg 46 now lies against the front surface of the body and keeps the fish 56 from moving forward, i.e., toward the nose of the fish. In this position (B of FIG. 7) the fish moves into the full decapitating and eviscerating zone with the fish head hanging slightly downwardly and ready to be engaged by arm 44 of the impact device 37 rotating in the direction of arrow 54 and forced downwardly onto slide 39. Arm 54 swings downwardly to force the fish head 55 onto slide 39, as shown at position C of FIG. 7, causing the head 55 to be relatively twisted from the fish body and severed from the remaining connection to the body and to pull with it the connected entrails 57 of the fish 56. An arcuate chute 39 holds the head and entrails for about one-fourth turn of impact device 37 and directs them to a receiver for further processing. The cleaned fish are packed and sold and/or frozen.

Figure 8:
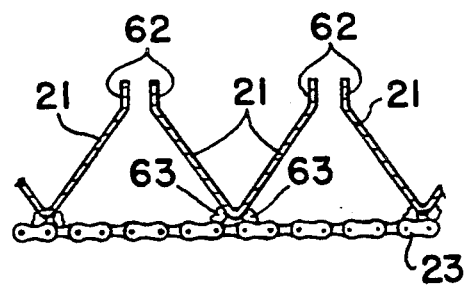
FIG. 8 is an enlarged cross sectional view of a preferred type of fish receptacle as shown at 7—7 of FIG. 1.

In FIG. 8 there is shown a preferred shape of the fish receptacles 21 in cross section. As may be seen the cross sectional shape is generally a Vee, with the upward ends 62 of the V bent to a vertical position. It will be appreciated that any generally V-shape or U-shape is suitable for fish receptacles 21. Receptacle 21 are preferably welded, or otherwise fastened rigidly to chains 23 as shown at 63.

In summary, a fish decapitator and eviscerator in accord with this invention includes an elongated frame and a power driven conveyor, with a continuous series of V-shaped, open ended receptacles respectively supporting each fish, with belly down and back up. A laser guide line light is mounted above the conveyor and directed to project downward at a 0–30 degree angle to provide a visible red line parallel to the conveyor and outwardly from the V-shaped receptacles for the appropriate placing of each fish head and neck outward to its correct position. The fish then move by the conveyor beneath an upper guide and a power rotated blade, rotating on an axis of 0–30 degree angle and outward of the V-shaped receptacles, in line with the laser guide light line, cuts the neck of the fish at a 0–30 degree angle, down and through its backbone, while the fish are longitudinally moving by the conveyor. The partially decapitated fish then move beneath an L-shaped guide which has a leg above the fish and another leg adjacent the cut through the fish being partially decapitated at a 0–30 degree angle, and in alignment with the rotating blade. The guide follows the cut in the neck of the fish, holding the fish in place while a power rotating paddle having a plurality of arms with edges parallel with the other leg o the guide, forces the head of each previously cut fish downward and outward onto a curved slide for about one-fourth of the radius of paddle holding the now fully cut head and entrails. This action successfully severs the head portion and eviscerates the fish simultaneously and the waste falls by gravity from being ejected by a paddle from the slide into a suitable container. The decapitated and eviscerated fish continues movement around the end of the conveyor and drops into packing boxes to be frozen.

It is understood that posts 29, 30, 43 are shown, for illustration purposes, as being close to the edge of the conveyor, but in practice these should be spaced outwardly of the conveyor to permit the fish heads to pass with respect thereto.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An apparatus for decapitating and eviscerating fish comprising a frame, an endless chain conveyor movable along a longitudinal axis and supported on said frame, power means causing said conveyor to travel in an endless cyclical path, a plurality of receptacles on said conveyor to receive and carry one fish in a horizontal position per receptacle through zones for partially beheading, and fully beheading and eviscerating, a power cutter positioned to cut through the head, backbone and only partly through the remainder of the body of each fish as it passes by said cutter, and a rotating impact means positioned laterally of said conveyor and having a rotative axis extending substantially parallel with said longitudinal axis to strike each fish head after it has been cut by said cutter by a substantially vertical force directed toward said conveyor and sufficient to detach the fish head and simultaneously to pull the entrails from the body of the fish.

2. The apparatus of claim 1 wherein said conveyor comprises two side by side parallel spaced chains with said receptacles positioned generally perpendicular to and bridging said chains.

3. The apparatus of claim 1 wherein said cutter is a single revolving disc cutter.

4. The apparatus of claim 1 wherein said impact means includes a plurality of rigid arms extending outwardly to free ends from a central shaft movable about said rotative axis, said free ends engaging the head of the fish during rotation of said shaft.

5. The apparatus of claim 3 wherein said cutter is adjustable with respect to the position of the cut, the depth of the cut and the angle of the cut.

6. The apparatus of claim 1 which additionally comprises an adjustable guide means to maintain each fish in its receptacle during said partially beheading zone and to hold it steady while passing through said fully beheading and eviscerating zone said adjustable guide means including a pair of spaced vertical members and locking means for affixing the vertical height of said guide means on each of said vertical members.

7. The apparatus of claim 6 wherein said guide means includes a horizontal component to engage the fish into its receptacle in said fully beheading and eviscerating zone, and a vertical component positioned to be in substantially planar alignment with said cutter.

8. The apparatus of claim 1 which additionally comprises a light means to provide a visible line of light for aligning fish as they are loaded into said receptacles on said conveyor.

9. The apparatus of claim 1 wherein said receptacles are V-shaped troughs positioned substantially perpendicular to said longitudinal axis of said conveyor.

10. An apparatus for receiving fish and conducting them through operations to decapitate and eviscerate the fish and delivering headless fish with the entrails removed, the apparatus comprising:
(a) an endless travelling conveyor having two parallel chains and a plurality of trough sections attached to and positioned perpendicular to said chains, each said trough receiving and conveying a single fish in a horizontal position with a similar orientation of its position to each other fish;
(b) power means to move said conveyor in a continuous manner and at a substantially constant speed in a horizontal direction of travel;
(c) a horizontal guide member adjustable positioned vertically above said conveyor and adapted to cover each fish in its said trough section while extending lengthwise in said trough section with its belly downward and its back upward during cutting of the head of the fish and decapitating and eviscerating of the fish;
(d) a single rotating disc cutter adjustably positioned above said conveyor and adapted to cut through the back and the backbone of each fish; and
(e) a rotating impact means positioned laterally of said conveyor and having a rotative axis extending substantially parallel with said horizontal direction of travel positioned to deliver a substantially vertical force toward said conveyor on the partially cut head of each fish after being subjected to said disc cutter; said guide holding each fish while the force is being applied to separate the head fully and the entrails from the remainder of the fish.

11. The apparatus of claim 10 which additionally comprises an adjustable overhead lighting means to produce a visible line of light at a selected distance from said conveyor to provide an index for properly positioning fish into respective said trough sections of said conveyor.

12. The apparatus of claim 10 wherein said guide member is an elongated beam with a vertical leg sliding through the partial cut in the fish head made by said cutter.

13. An apparatus for decapitating and eviscerating fish comprising a frame, an endless chain conveying means supported on said frame, power means for moving said conveyor in an endless cyclical path, a plurality of receptacles mounted to said conveying means for receiving and carrying along a horizontal path a respective fish in respective said receptacle through successive zones for partial beheading, and fully beheading and eviscerating, a power cutting means mounted above said conveyor and to said frame and positioned to only cut each fish partially through its head and backbone as it is conveyed past said cutting means, stop means attached to said frame for maintaining each fish in its said receptacle during partial beheading, and fully beheading and eviscerating, and impact means disposed laterally of said receptacles and adjacent each fish head therein to apply a substantially vertical striking force on each fish head in a direction substantially perpendicular to said horizontal path after it has been cut by said cutting means sufficiently to completely detach a fish head from a fish body and simultaneously to pull fish entrails from a fish body, each decapitated and eviscerated fish being subsequently removed from respective receptacle.

14. The apparatus of claim 13 wherein said impact means includes a plurality of rigid arms extending outwardly from a central rotating shaft and an arcuate plate having an upper edge adjacent to a cut in a fish provided by said cutting means.

15. The apparatus of claim 13 wherein said cutting means is a revolving disc cutter, said cutter being adjustable with respect to the position of the cut and the depth of the cut and the angle of the cut.

16. The apparatus of claim 13 wherein said stop means includes an elongated plate to lightly press against each fish while in its own said receptacle to hold it steady while passing through said fully beheading and eviscerating zone.

17. The apparatus of claim 16 wherein said elongated plate includes a horizontal component to inhibit the fish from vertical movement outwardly of its receptacle, and a vertical component in planar alignment with said cutter.

18. The apparatus of claim 17 wherein said vertical component is inclined so that an acute included angle is formed with said horizontal component.

19. The apparatus of claim 17 wherein said horizontal component includes an elongated upstanding groove extending along said plate to accommodate a top fin of some fish.

20. The apparatus of claim 13 which additionally comprises a light means to provide a visible line of light for accurately aligning fish as they are loaded onto said conveyor for beheading and eviscerating.

21. A processing for decapitating and eviscerating fish which comprises:
(a) placing a plurality of elongated fish in a spaced side-by-side horizontal alignment with the bottom of the fish down and the top of the fish up and continuously moving the plurality of fish through a cutting zone where the fish are partially decapitated by being cut down through the head and the backbone in a direction generally perpendicular to the backbone;
(b) restraining the partially decapitated fish from any substantial horizontal movement toward the head of the fish while continuously moving the plurality through an eviscerating zone;
(c) impacting each partially decapitated head in the eviscerating zone by a force extending substantially vertically downward and perpendicular to the backbone of the fish to pull the head away from the body of the fish and to remove entrails from the fish; and
(d) recovering a plurality of decapitated fish in spaced side-by-side horizontal alignment.

22. The process of claim 21 wherein said cutting zone includes a rotating cutter means in a stationary location suspended above the plurality of fish which continuously move through the cutter means to be partially decapitated.

23. The process of claim 22 wherein said impacting includes rotating arms having free ends extending from a shaft which ends contact the partially decapitated head of the fish along the cut through the head and the backbone and pushes the head vertically downward to separate it completely from the fish and simultaneously pulling the entrails outwardly to follow the head.

24. The process of claim 23 wherein each arm moves substantially vertically while impacting the fish as it moves horizontally and thereby producing a twisting force on the fish and fish head.

25. The process of claim 23 wherein each arm moves in an arcuate path about the shaft extending perpendicular to the backbone and spaced from an arcuate slide for receiving and moving the head and entrails down the slide into a recovery zone.

26. The process of claim 21 wherein the horizontal alignment includes a visible line of light directed perpendicular to the fish to produce a guide for placing the fish.

* * * * *